United States Patent
Fannin et al.

(10) Patent No.: US 10,971,020 B1
(45) Date of Patent: Apr. 6, 2021

(54) AIRCRAFT SYSTEM AND METHOD TO PROVIDE LINEAR MAP OF TRAFFIC

(71) Applicant: Rockwell Collins, Inc., Cedar Rapids, IA (US)

(72) Inventors: Timothy R. Fannin, Urbana, IA (US); Keith A. Stover, Lisbon, IA (US); Eric N. Anderson, Marion, IA (US); Sarah Barber, Cedar Rapids, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/887,779

(22) Filed: May 29, 2020

(51) Int. Cl.
*G01C 23/00* (2006.01)
*G08G 5/00* (2006.01)
*B64D 43/00* (2006.01)

(52) U.S. Cl.
CPC .......... *G08G 5/0021* (2013.01); *B64D 43/00* (2013.01)

(58) Field of Classification Search
CPC .................................................. G08G 5/0021
USPC ...... 340/971, 972, 979, 980; 701/4, 14, 120, 701/300, 301; 342/27, 29, 30
See application file for complete search history.

(56) References Cited

U.S. PATENT DOCUMENTS

| | | |
|---|---|---|
| 5,179,377 A | 1/1993 | Hancock |
| 6,911,936 B2 | 6/2005 | Stayton et al. |
| 8,099,201 B1 | 1/2012 | Barber et al. |
| 9,437,112 B1 | 9/2016 | Greene |
| 9,472,109 B2 | 10/2016 | Starr et al. |
| 9,501,936 B2 | 11/2016 | Trefilova et al. |
| 10,490,089 B2 | 11/2019 | Khatwa et al. |
| 2011/0118908 A1* | 5/2011 | Boorman ............. G08G 5/0052 701/14 |
| 2014/0297169 A1* | 10/2014 | Le ........................ G08G 5/0021 701/121 |
| 2016/0012732 A1 | 1/2016 | Shanbhag et al. |
| 2017/0103660 A1* | 4/2017 | Shafaat .................. B64D 45/04 |
| 2017/0183104 A1 | 6/2017 | Colby |

(Continued)

FOREIGN PATENT DOCUMENTS

EP      2666150 B1      3/2019

OTHER PUBLICATIONS

United States Department of Transportation: Federal Aviation Administration, "Airworthiness Approval for ADS-B in Systems and Applications", pp. 19-22, Document 20-172B, May 20, 2015.

(Continued)

*Primary Examiner* — Tai T Nguyen
(74) *Attorney, Agent, or Firm* — Suiter Swantz pc llo (57) ABSTRACT

A system may include a display and a processor. The processor may be configured to: receive aircraft traffic data and ownship data; generate and update a linear map based on the aircraft traffic data and the ownship data; and output the linear map as graphical data to the display. The display may be configured to display the linear map to a user. The linear map may depict a one-dimensional relationship between an ownship and designated traffic. The linear map may convey a range between the ownship and the designated traffic and may convey a closure rate between the ownship and the designated traffic. The linear map may include: a graphical threshold indicator; a graphical ownship indicator; a graphical scale; and a graphical designated traffic indicator.

15 Claims, 10 Drawing Sheets

(56) References Cited

U.S. PATENT DOCUMENTS

2019/0340936 A1   11/2019   Manberg et al.
2019/0362690 A1   11/2019   Bouda et al.

OTHER PUBLICATIONS

United States Department of Transportation: Federal Aviation Administration, "Automatic Dependent Surveillance-Broadcast Operations", Appendix 3, p. 2, Document 90-114A, Mar. 7, 2016.

Kim, Kyungtae et al., "Beacon-Less Operation and Idle Ping Slot Control for Low Power Communication in LoRaWAN" KIPS Tr. Comp. and Comm. Sys., vol. 6, No. 5, pp. 231-238, Accessed Apr. 28, 2020.

Bone, Randall S. et al., MITRE, "Air Traffic Controller and Flight Crew Conduct of a No-Closer-Than Spacing Task Utilizing a Cockpit Display of Traffic Information", 33 pages, Document MITRI50066, Mar. 2015.

* cited by examiner

AIRCRAFT SYSTEM AND METHOD TO PROVIDE LINEAR MAP OF TRAFFIC

BACKGROUND

Advanced traffic applications are being defined in the industry for more efficient management and spacing of aircraft traffic into, and within, crowded airspace. Most of these applications require the flight crew to manage a tight spacing relative to other aircraft in either distance or time but provide only a minimum set of data to the crew. Additionally, a significant portion of existing aircraft fleets do not have a display surface or display capabilities to efficiently manage spacing of aircraft traffic.

SUMMARY

In one aspect, embodiments of the inventive concepts disclosed herein are directed to a system. The system may include a display configured to present images to a user and a processor communicatively coupled to the display. The processor may be configured to: receive aircraft traffic data and ownship data; generate and update a linear map based on the aircraft traffic data and the ownship data; and output the linear map as graphical data to the display. The display may be configured to display the linear map to the user. The linear map may depict a one-dimensional relationship between an ownship and designated traffic. The linear map may convey a range between the ownship and the designated traffic and may convey a closure rate between the ownship and the designated traffic. The linear map may include: a graphical threshold indicator, the threshold indicator representing a time or distance from a threshold to the designated traffic; a graphical ownship indicator depicting a position of the ownship; a graphical scale representing a time or distance displayed by the linear map; and a graphical designated traffic indicator depicting a position of the designated traffic.

In a further aspect, embodiments of the inventive concepts disclosed herein are directed to a method. The method may include: receiving, by a processor, aircraft traffic data and ownship data, the processor communicatively coupled to a display, the display configured to present images to a user. The method may include: generating and updating, by the processor, a linear map based on the aircraft traffic data and the ownship data, wherein the linear map depicts a one-dimensional relationship between an ownship and designated traffic, wherein the linear map conveys a range between the ownship and the designated traffic and conveys a closure rate between the ownship and the designated traffic, wherein the linear map includes: a graphical threshold indicator, the threshold indicator representing a time or distance from a threshold to the designated traffic; a graphical ownship indicator depicting a position of the ownship; a graphical scale representing a time or distance displayed by the linear map; and a graphical designated traffic indicator depicting a position of the designated traffic. The method may include: outputting, by the processor, the linear map as graphical data to the display. The method may include: displaying, by the display, the linear map to the user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein may be directed to a system and a method configured to provide a linear map of aircraft traffic.

Some embodiments may provide a small and intuitive display feature that conveys range and closure rate to pre-identified traffic by using a linear map having a mix of symbols and digits. Some embodiments may use automatic dependent surveillance-broadcast incoming (ADS-B In) applications. For example, such embodiments may be implemented in a retrofit environment where there may only be room for a small auxiliary primary field of view display. Some embodiments may integrate new functionality into existing systems that enable efficient management of traffic. Some embodiments may include a compact display feature to provide the crew with the necessary information to complete the spacing operation, which would be beneficial to the crew. Some embodiments may enable retrofitting a display feature into existing flight decks, where the feature's intuitive operation and its potential for lower cost and lower risk could be driving factors in the feature's appeal for both pilots and operators as well as in the feature's ability to have widespread adoption across existing fleets. Some embodiments can improve the situational awareness and reduce the workload of the flight crew when managing spacing of traffic.

Some embodiments may provide a display of a linear map depicting a horizontal relationship between ownship and designated traffic. The linear map may include a compact scale to convey range, closure rate, and other information elements relevant to the specific traffic application being used by the pilot. Because the linear map display feature may be compact, the linear map can be incorporated into any suitable display (e.g., a small supplemental display, an existing avionics display system, a head-up display (HUD), a head-down display (HDD), a multi-function window (MFW) display, a primary flight display (PFD), and/or a portable computing device having a display). The linear map may be used in support of traffic applications, such as cockpit display of traffic information (CDTI)-assisted visual separation (CAVS) or flight-deck interval management (FIM).

Some embodiments may provide a compact intuitive display providing situational awareness for traffic application operations (such as CAVS or FIM) while consuming a minimal amount of display area.

Figure 1:
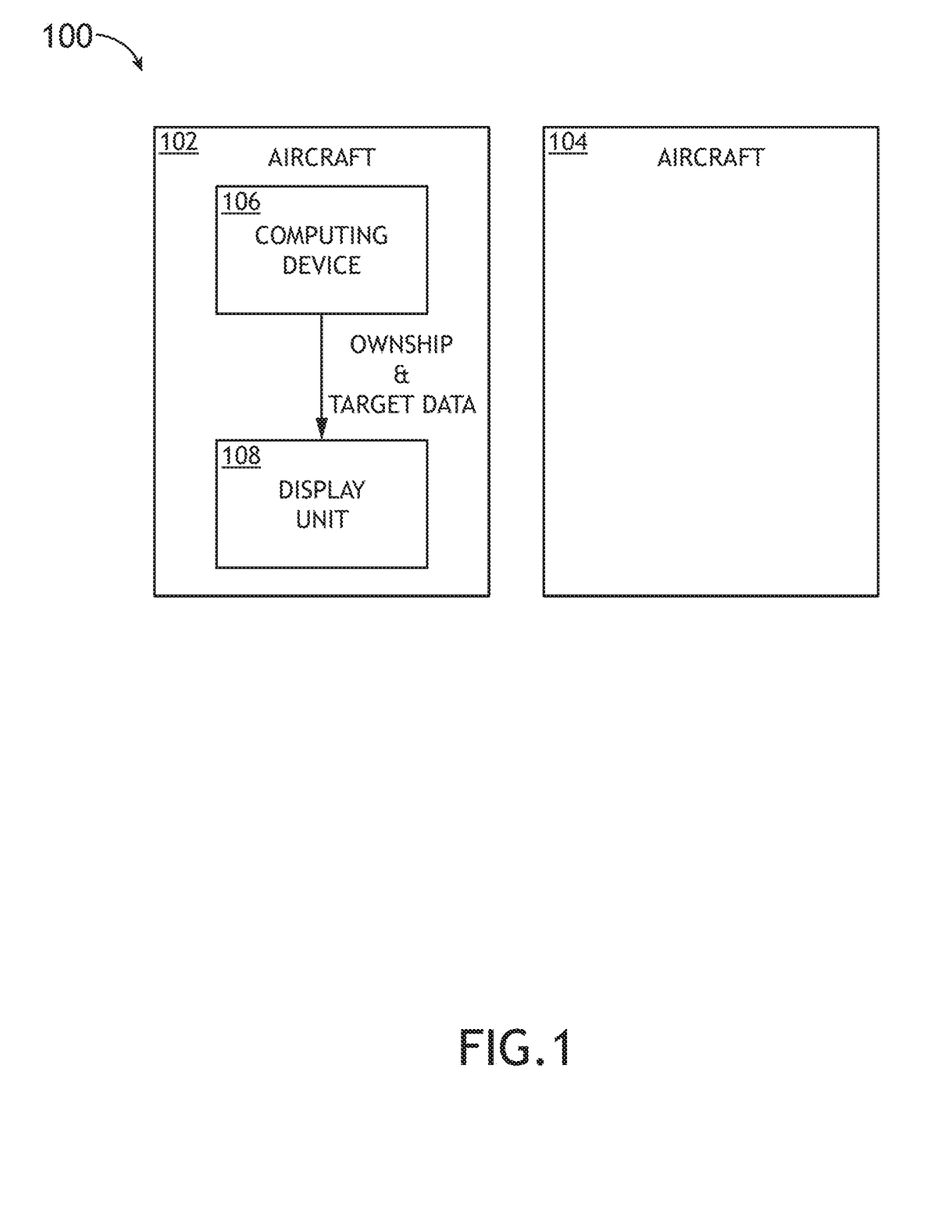
FIG. 1 is a view of an exemplary embodiment of a system according to the inventive concepts disclosed herein.
Figure 2:
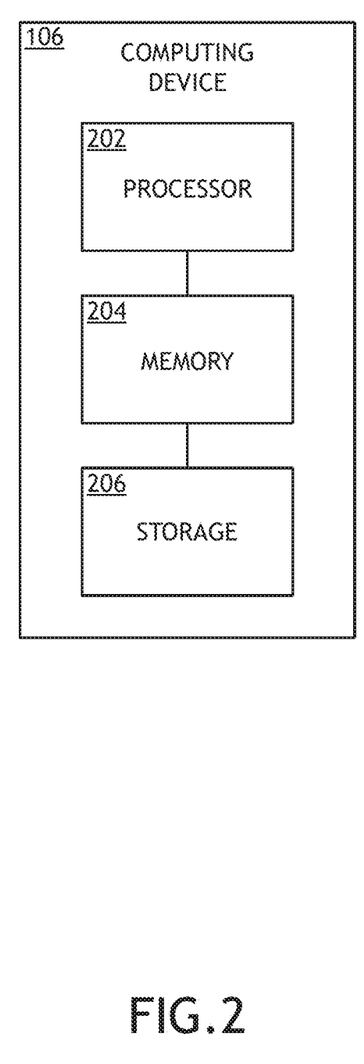
FIG. 2 is a view of the computing device of the system of FIG. 1 according to the inventive concepts disclosed herein.
Figure 3:
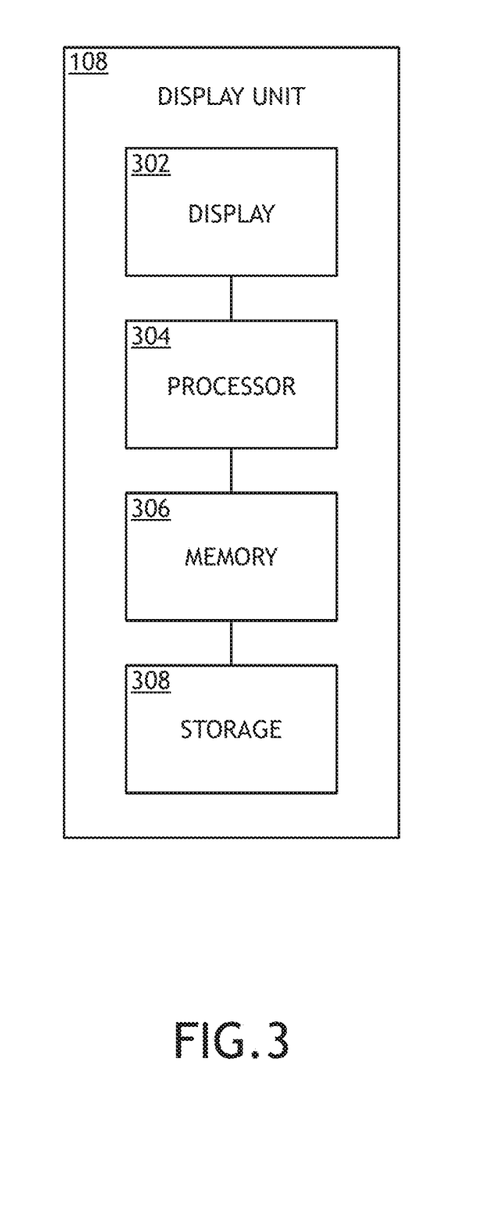
FIG. 3 is a view of the display unit of the system of FIG. 1 according to the inventive concepts disclosed herein.

Referring now to FIGS. 1-3, an exemplary embodiment of a system 100 according to the inventive concepts disclosed herein is depicted. In some embodiments, the system 100 may include a first aircraft 102 (e.g., an ownship) and at least one other aircraft 104 (e.g., designated traffic), some or all of which may be in communication with each other at any given time. The aircraft 102 may include at least one user (e.g., a pilot, a crew member, and/or an operator), at least one computing device 106, and/or at least one display unit computing device 108, as well as any other equipment commonly found on an aircraft, some or all of which may be communicatively coupled at any given time. In some embodiments, the at least one display unit computing device 108 and/or the at least one computing device 106 may be implemented as a single computing device or any number of computing devices configured to perform (e.g., collectively perform if more than one computing device) any or all of the operations disclosed throughout.

The at least one computing device 106 may be implemented as any suitable computing device, such as a traffic computing device. For example, the computing device 106 may include at least one processor 202, at least one memory 204, at least one storage 206, and/or any suitable user interface(s), some or all of which may be communicatively coupled at any given time. For example, the at least one processor 202 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 202 may include a CPU and a GPU configured to perform (e.g., collectively perform) any of the operations disclosed throughout. The processor 202 may be configured to run various software applications (e.g., an ADS-B In application) or computer code stored (e.g., maintained) in a non-transitory computer-readable medium (e.g., memory 204 and/or storage 206) and configured to execute various instructions or operations. The processor 202 of the computing device 106 may be configured to perform any or all of the operations disclosed throughout. For example, the processor 202 of the computing device 106 may be configured to: output aircraft traffic data and/or ownship data to the display unit computing device 108. For example, the traffic data may be or may be derived from ADS-B In data, and the traffic data may include information related to designated traffic (e.g., aircraft 104), such as position, speed, trajectory, and/or heading. For example, the ownship data may include information related to the ownship's (e.g., aircraft 102) position, speed, trajectory, and/or heading.

Figure 5A:
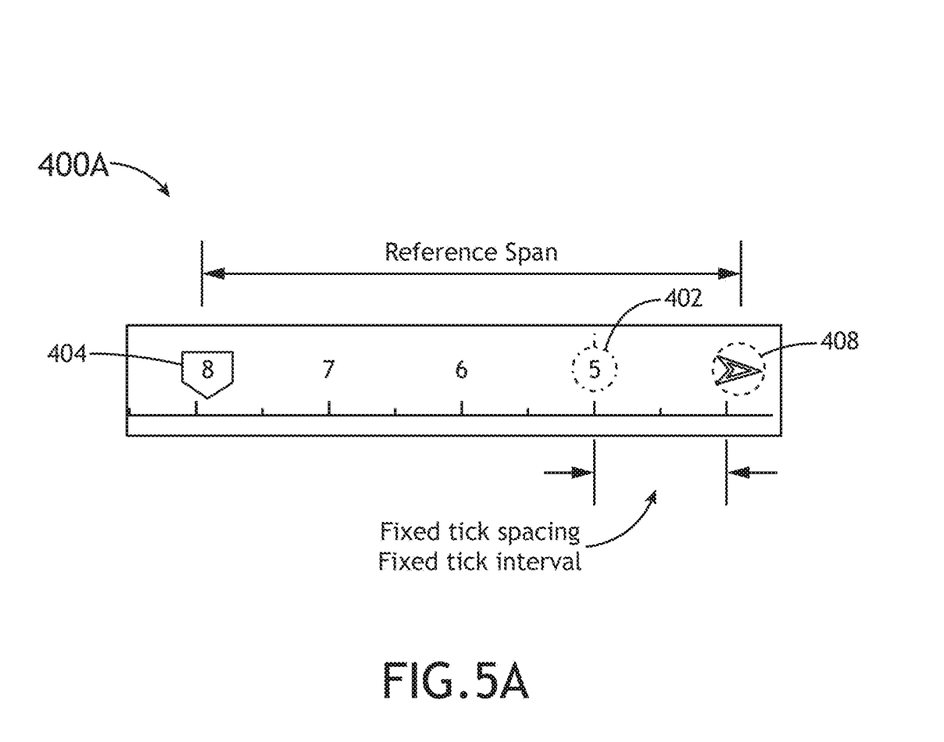
FIG. 5A is a view of an exemplary embodiment of the display unit of FIG. 3 displaying an exemplary linear map according to a first mode according to the inventive concepts disclosed herein.
Figure 5B:
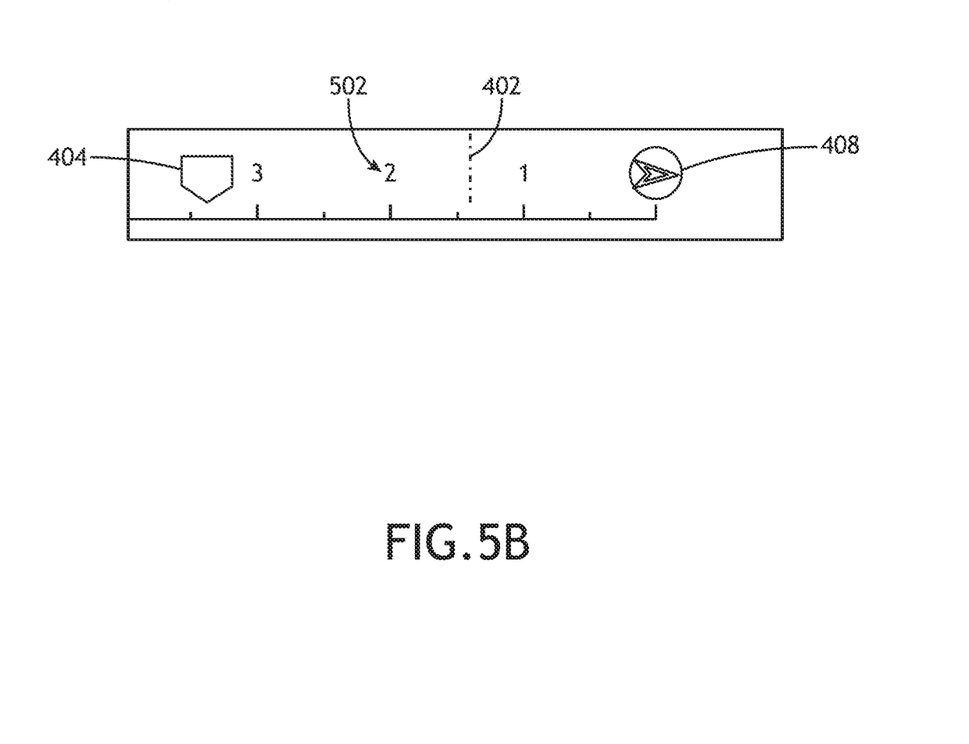
FIG. 5B is a view of an exemplary embodiment of the display unit of FIG. 3 displaying an exemplary linear map according to the first mode according to the inventive concepts disclosed herein.
Figure 5C:
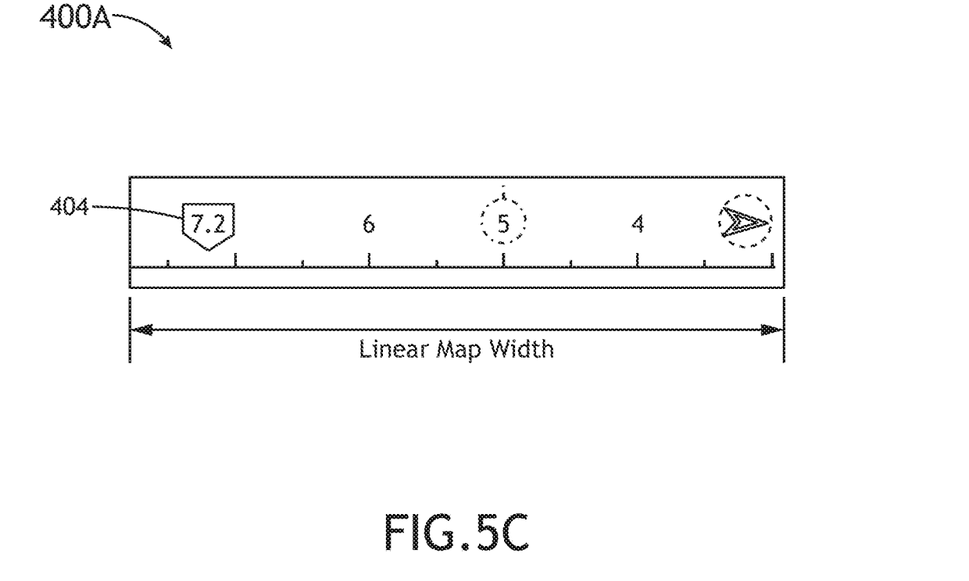
FIG. 5C is a view of an exemplary embodiment of the display unit of FIG. 3 displaying an exemplary linear map according to the first mode according to the inventive concepts disclosed herein.
Figure 6:
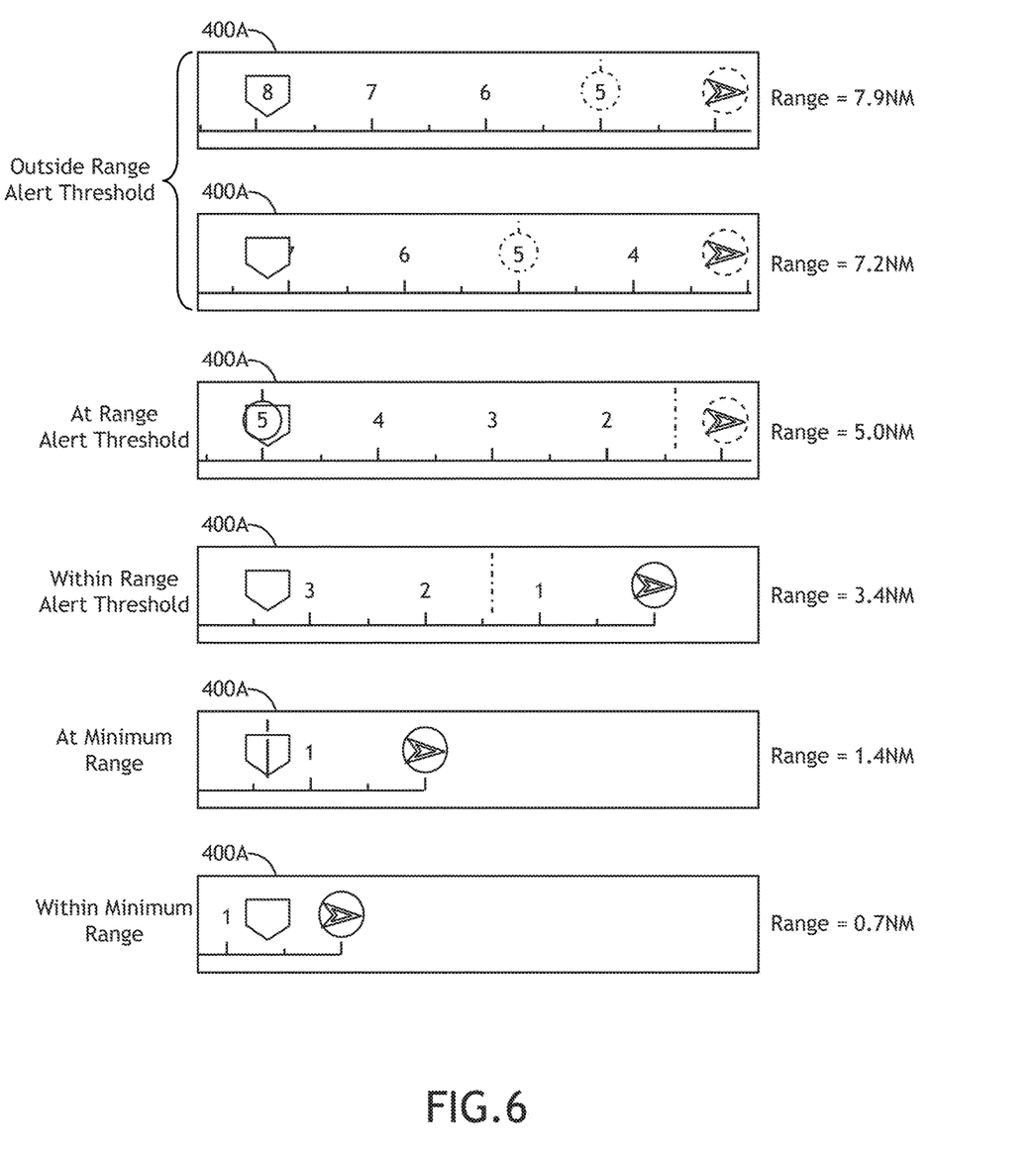
FIG. 6 is a view of an exemplary embodiment of the display unit of FIG. 3 displaying views of an exemplary linear map according to the first mode according to the inventive concepts disclosed herein.
Figure 7A:
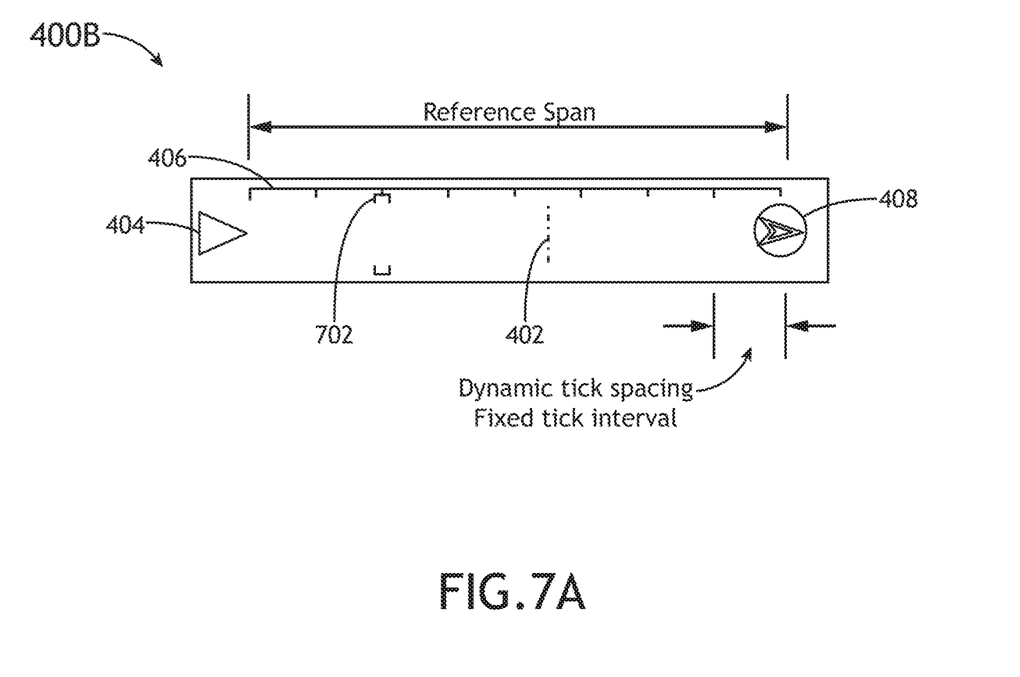
FIG. 7A is a view of an exemplary embodiment of the display unit of FIG. 3 displaying an exemplary linear map according to a second mode according to the inventive concepts disclosed herein.
Figure 7B:
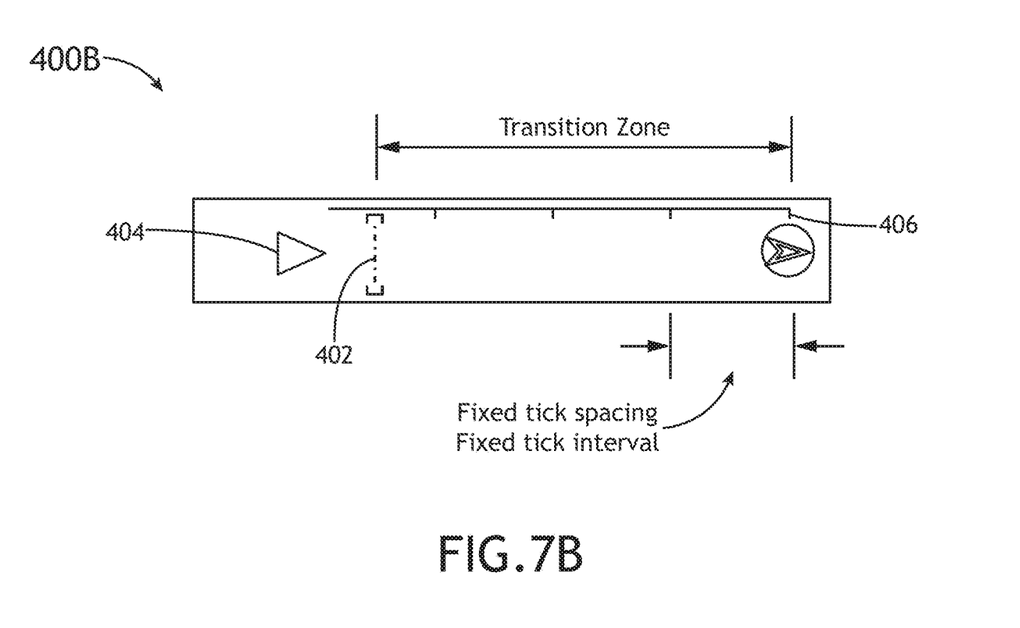
FIG. 7B is a view of an exemplary embodiment of the display unit of FIG. 3 displaying an exemplary linear map according to the second mode according to the inventive concepts disclosed herein.
Figure 7C:
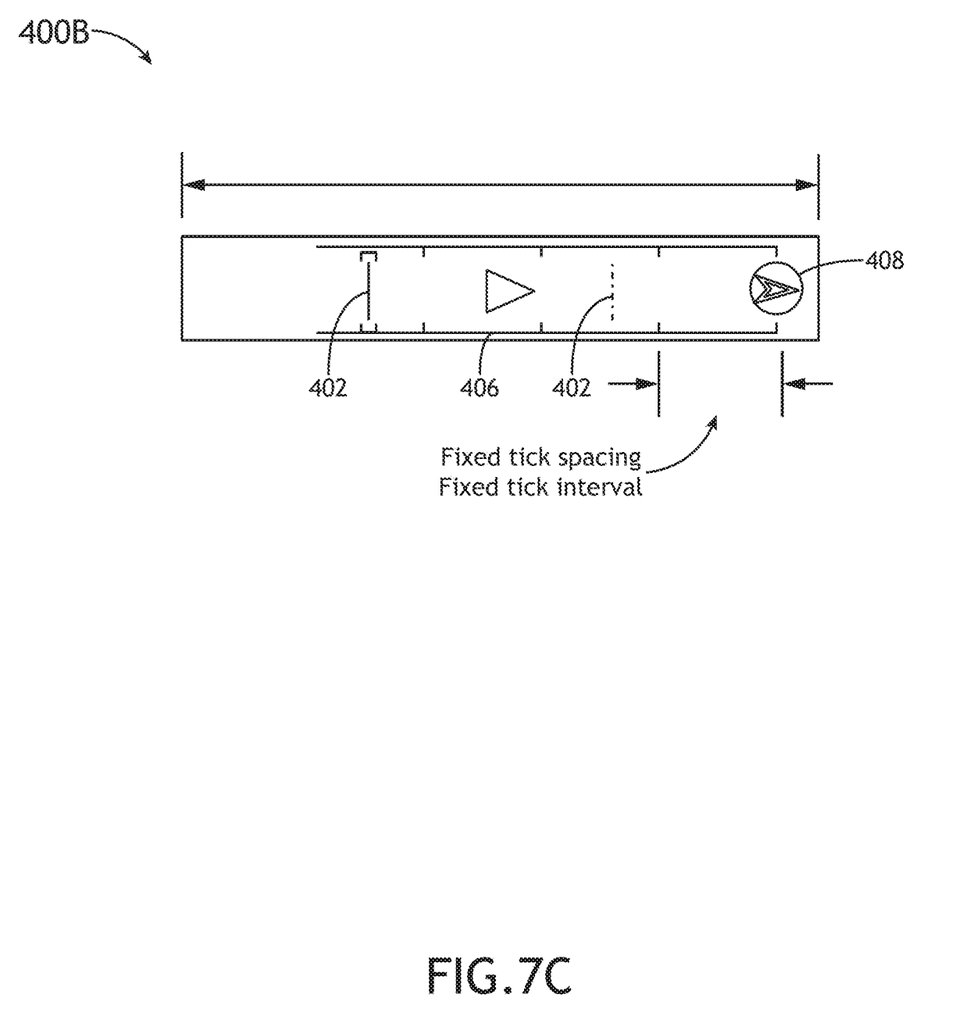
FIG. 7C is a view of an exemplary embodiment of the display unit of FIG. 3 displaying an exemplary linear map according to the second mode according to the inventive concepts disclosed herein.
Figure 8:
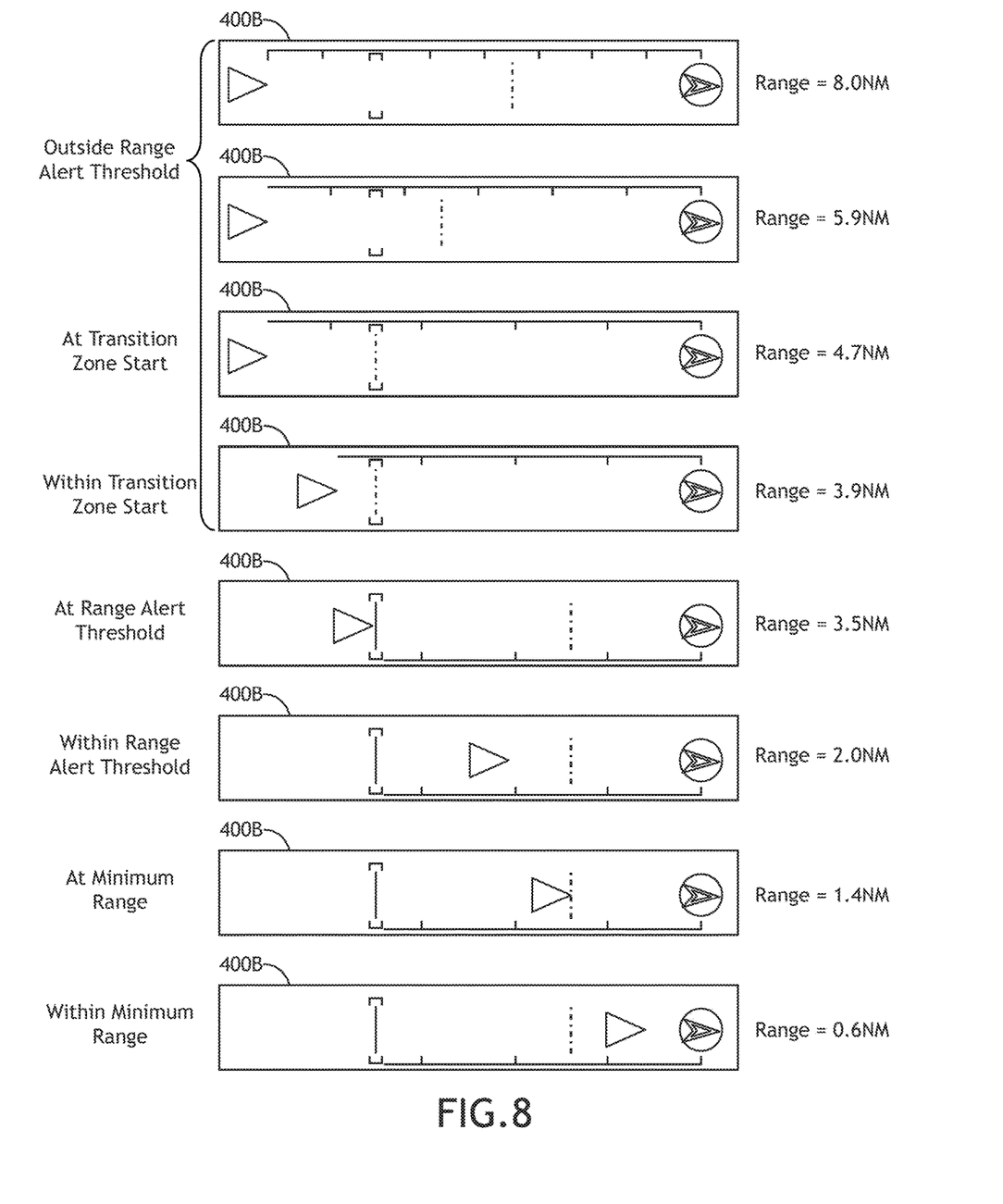
FIG. 8 is a view of an exemplary embodiment of the display unit of FIG. 3 displaying views of an exemplary linear map according to the second mode according to the inventive concepts disclosed herein.

The display unit computing device 108 may be any suitable computing device having at least one display 302, such as a PFD, an MFW display, an HUD, an HDD, and/or a portable computing device display (e.g., a display of a laptop computer, a tablet computing device, or a phone computing device). As shown in FIG. 3, the display unit computing device 108 may include at least one display 302, at least one processor 304, at least one memory 306, and/or at least one storage 308, some or all of which may be communicatively coupled at any given time. For example, the at least one processor 304 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 304 may include a CPU and a GPU configured to perform (e.g., collectively perform) any of the operations disclosed throughout. The processor 304 may be configured to run various software applications (e.g., a PFD application and/or an MFW application) or computer code stored (e.g., maintained) in a non-transitory computer-readable medium (e.g., memory 306 and/or storage 308) and configured to execute various instructions or operations. The processor 304 may be configured to perform any or all of the operations disclosed throughout. For example, the processor 304 may be configured to: receive the traffic data and/or ownship data from the computing device 106; generate and update a linear map based at least on the traffic data and/or the ownship data; and/or output the linear map as graphical data to the display 302. In some embodiments, the processor 304 may be configured to generate the linear map according to one of two or more modes (e.g., a basic mode (e.g., as shown in FIGS. 5A-6) and an adaptive mode (e.g., as shown in FIGS. 7A-8)). In such embodiments, the processor 302 may be configured to switch between the two or more modes of generating the linear map, for example, based on a user input. The display 302 may be configured to display the linear map to a user.

Figure 4:
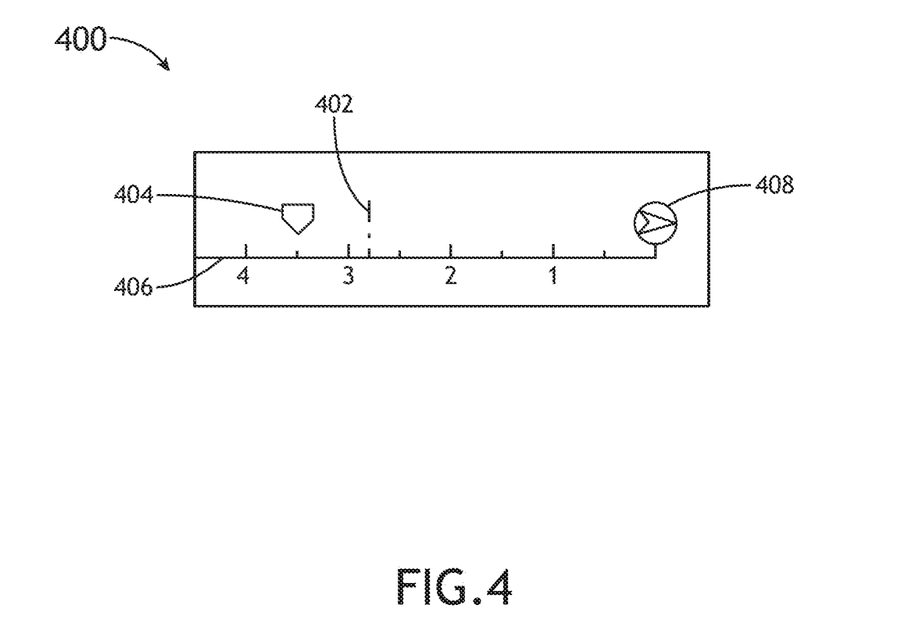
FIG. 4 is a view of an exemplary embodiment of the display unit of FIG. 3 displaying an exemplary linear map according to the inventive concepts disclosed herein.

Referring now to FIG. 4, an exemplary embodiment of the display unit computing device 108 displaying a linear map 400 according to the inventive concepts disclosed herein is depicted. The linear map 400 may depict a one-dimensional (e.g., horizontal) relationship between ownship (e.g., aircraft 102) and designated traffic (e.g., aircraft 104) For example, the linear map 400 may include a plurality of graphical elements, such as at least one threshold indicator 402, an ownship indicator 404 (e.g., an ownship pointer), a scale 406, and/or designated traffic indicator 408.

Each of the at least one threshold indicator 402 may be a graphical depiction of a distance or time threshold, which represents a time or distance from the threshold to the designated traffic. Each threshold can be set by the flight crew or computed by a computing device (e.g., 106 or 108). The graphical appearance of each threshold indicator 402 may vary, for example, depending on a type of threshold (e.g., advisory or alert) or on a relationship of ownship relative to the threshold (e.g., ownship outside the threshold or inside the threshold). More than one threshold indicator 402 may appear on the linear map 400, for example, depending on the traffic application being used and a specific situation (e.g., a minimum range threshold indicator may be displayed only when current range is less than or equal to a value represented by a range alert threshold indicator).

The ownship indicator 404 may be a graphical symbol depicting ownship. The ownship indicator 404 may optionally include a numeric readout of the current distance or time to the designated traffic.

The scale 406 may represent the distance or time to the designated traffic. The scale 406 may optionally include numerical readouts at set intervals.

The designated traffic indicator 408 may be a graphical symbol depicting designated traffic (e.g., aircraft 104).

In some embodiments, the linear map 400 may be displayed according to one of two modes: a basic mode (e.g., as shown in FIGS. 5A-6) and an adaptive mode (e.g., as shown in FIGS. 7A-8).

Referring now to FIGS. 5A-6, an exemplary embodiment of the display unit computing device 108 displaying a linear map 400A when operating in a basic mode according to the inventive concepts disclosed herein is depicted.

Operating in basic mode may place an emphasis on at-a-glance awareness of a closure rate between ownship and designated traffic.

The scale 406 may be sized to represent a fixed reference span (distance or time) relative to ownship. The reference span may correspond to a maximum possible graphical distance between the ownship indicator 404 and the designated traffic indicator 408. Major and minor tick marks may be included as part of the scale 406. Major and minor tick marks may be placed at fixed intervals (e.g. 1 nautical mile (NM) or any suitable time or distance) with fixed spacing (e.g. 100 pixels or any suitable pixel number) between tick marks. Scale labels 502 may be present for major tick marks. Depending on display space considerations, scale labels 502 may be placed below the scale 406 or above the scale 406. The scale 406 may be allowed to slide horizontally along the display 302.

The ownship indicator 404 may be fixed near one side (e.g., a left side) of linear map display area. In some embodiments, the ownship indicator 404 may be graphically laid out so that characters may fit inside the ownship indicator 404; for example, when scale labels 502 are placed above the scale 406, the ownship indicator 404 may be effectively transparent to allow the scale labels to be visible as scale labels 502 slide underneath, as shown in FIG. 5A. In some embodiments, the ownship indicator 404 may be used to display the current range (e.g., distance or time) to designated traffic, as shown in FIG. 5C.

The designated traffic indicator 408 may be nominally attached to the scale's 406 zero point, but may be disallowed from going off-screen by "parking" the designated traffic indicator 408 on the right side of the linear map display area. A distinctly different depiction (e.g., dashed outline) may be used to indicate when the designated traffic indicator 408 is "parked".

Threshold indicators 402 may be attached to the scale 406 at an appropriate location based on distance or time and may be allowed to slide off-screen. For example, each threshold indicator 402 may be nominally drawn as a vertical line with a style (e.g. thickness, color, and/or line pattern) appropriate to a threshold indicator type. When a threshold indicator 402 graphically coincides with a scale label 502, the depiction of the threshold indicator 402 may change (e.g., to include a circle surrounding the scale label 502 drawn in the same style as the rest of the threshold indicator 402 to allow both the scale label 502 and the threshold indicator 402 to be visible).

Closure rate may be conveyed to a user by a motion of the scale 406 relative to the ownship indicator 404. Leftward motion of the scale 406 (i.e. toward the ownship indicator 404) may represent the two aircraft closing. Rightward motion of the scale 406 (i.e. away from the ownship indicator 404) represents the two aircraft separating.

FIG. 6 shows an exemplary sequence of views of the linear map 400A in basic mode at six ranges between the ownship and the designated traffic, where the ownship approaches the designated traffic. The linear map 400A may be generated using a CAVS application. Starting at the top of the six views and moving down, the scenario begins with ownship at a range of 7.9 NM from the designated traffic. With the linear map configured with a reference span of 4.0 NM, the designated traffic indicator 408 starts as parked on the right side of the linear map 400A. As ownship approaches designated traffic, the scale 406 may slide to the left even with the designated traffic indicator 408 parked. When the current range drops below 4.0 NM, the designated traffic indicator 408 may start moving toward the left.

Referring now to FIGS. 7A-8, an exemplary embodiment of the display unit computing device 108 displaying a linear map 400B when operating in an adaptive mode according to the inventive concepts disclosed herein is depicted.

Operating in adaptive mode may place an emphasis on at-a-glance awareness of the relationship between ownship, designated traffic, and the relevant threshold indicators 402 at all times.

A transition zone may be defined to represent a percentage of a width of the linear map display area. For example, a transition zone set to 100% represents the full width of the display area. For example, a transition zone set to 75% represents 75% of the width of the display area measured from the designated traffic indicator 408 toward the ownship indicator 404. At least one transition indicator 702 (e.g., transition brackets) may be placed on the linear map 400B to represent a leftmost boundary of the transition zone. For a transition zone set to 100%, the transition indicators 702 may be omitted.

The scale 406 may be initially sized to an available display area width. The reference span (distance or time) may represent a current range (distance or time) from ownship to designated traffic. Major tick marks may be included as part of the scale 406. Major tick marks may be placed at fixed intervals (e.g., 1 NM), but the graphical spacing between tick marks may be dynamically adjusted so that the scale 406 always represents the current range (e.g., if the reference span is 400 pixels and the current range is 10 NM, then each 1 NM tick mark is spaced 40 pixels apart. If current range drops to 5 NM, then each 1 NM tick mark is spaced 80 pixels apart). The scale 406 may be fixed on the display 302.

The ownship indicator 404 may be initially fixed on the left side of the display area. The designated traffic indicator 408 may be fixed on the right side of the display area. The zero point of the scale 406 may be attached to the designated traffic indicator 408.

Threshold indicators 402 may be attached to the scale 406 at appropriate locations based on distance or time. Each threshold indicator may be nominally drawn as a vertical line with a style (e.g. thickness, color, and/or line pattern) appropriate to a particular threshold indicator type. In some embodiments, threshold indicators 402 may always be placed within the reference span. Threshold indicators may slide freely within the transition zone.

When the threshold indicator 402 closest to ownship is inside of (i.e., to the right of the transition indicators 702) the transition zone, closure rate may be conveyed to a user by the motion of the tick marks on the scale 406 relative to the ownship indicator 404. For example, tick marks moving toward the left (expanding) indicate that the two aircraft are closing. For example, tick marks moving toward the right (contracting) indicate that the two aircraft are separating.

When the threshold indicator 402 closest to ownship reaches the leftmost boundary of the transition zone (e.g., at the transition indicators 702), any or all of the following may occur the tick mark spacing on the scale 406 may become fixed; the threshold indicators 402 may be locked in place; the ownship indicator 404 may be unlocked and allowed to slide right to indicate current range (distance or time); the leftmost edge of the scale 406 may be attached to the ownship indicator 404; and/or closure rate may be conveyed to the user by the motion of the ownship indicator 404 relative to the designated traffic indicator 408 and other fixed elements on the linear map 400B (e.g., ownship motion toward designated traffic indicates the two aircraft are closing; ownship motion away from designated traffic indicates the two aircraft are separating).

When the ownship indicator 404 reaches the transition indicators 702, any or all of the following may occur: a threshold fixed scale 406 may be displayed along a lower edge of the linear map display area as an indication that ownship has crossed the first threshold indicator 402; the leftmost edge of the threshold fixed scale may be attached to the transition indicators 702; and/or closure rate may be communicated by the motion of the ownship indicator 404 relative to the designated traffic indicator 408 and other fixed elements on the linear map 400B (e.g., ownship motion toward designated traffic indicates the two aircraft are closing; ownship motion away from designated traffic indicates the two aircraft are separating).

FIG. 8 shows an exemplary sequence of views of the linear map 400B in adaptive mode at eight ranges between the ownship and the designated traffic, where the ownship approaches the designated traffic. The linear map 400B may be generated using a CAVS application. Starting at the top of the six views and moving down, the ownship may start outside of the transition zone. As the ownship approaches the designated traffic, the graphical spacing of the tick marks on the scale 406 may increase to indicate that the two aircraft are getting closer. The range alert threshold indicator (e.g., the first threshold indicator 402 the ownship approaches) attached to the scale 406 may also move leftward as further confirmation that the two aircraft are closing. When the range alert threshold indicator reaches the transition brackets (at a range of 4.7 NM), the range alert threshold indicator's leftward motion is stopped and the ownship indicator 404 is free to move rightward; this allows for a more explicit indication that ownship is moving toward the threshold indicators 402 and the designated traffic while maintaining all relevant elements in view at all times. As the ownship enters the transition zone, the scale 406 may switch from ownship-fixed to threshold-fixed. The change in the scale 406 may serve to maintain the pilot's awareness of the value(s) represented by the threshold indicator(s) 402.

While the linear maps 400, 400A, 400B shown in FIGS. 4-8 are exemplarily shown as having a particular horizontal left to right layout, in some embodiments, the layout can be reversed or transposed to a vertical layout.

Figure 9:
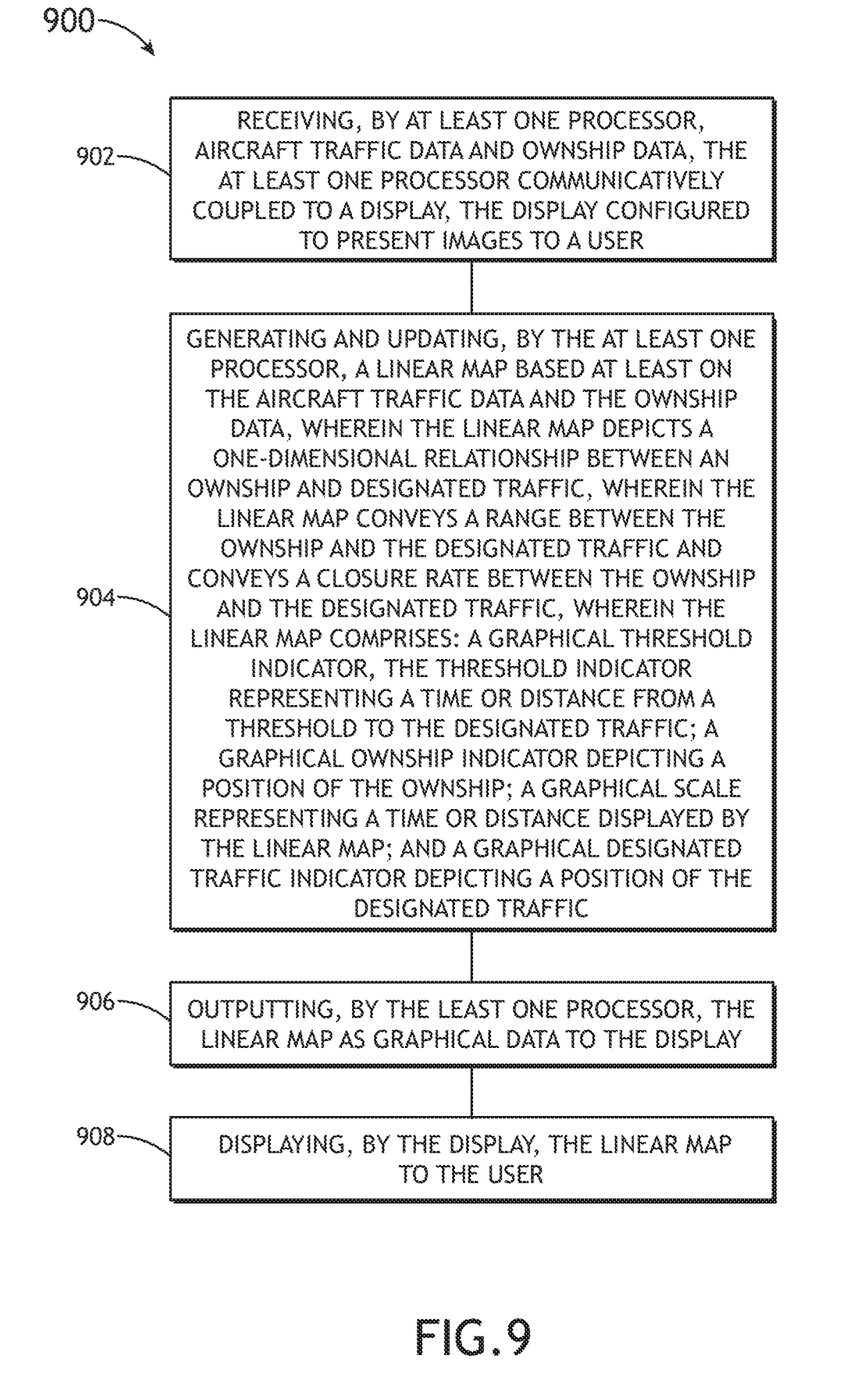
FIG. 9 is a diagram of an exemplary embodiment of a method according to the inventive concepts disclosed herein.

Referring now to FIG. 9, an exemplary embodiment of a method 900 according to the inventive concepts disclosed herein may include one or more of the following steps. Additionally, for example, some embodiments may include performing one or more instances of the method 900 iteratively, concurrently, and/or sequentially. Additionally, for example, at least some of the steps of the method 900 may be performed in parallel and/or concurrently. Additionally, in some embodiments, at least some of the steps of the method 900 may be performed non-sequentially.

A step 902 may include receiving, by at least one processor, aircraft traffic data and ownship data, the at least one processor communicatively coupled to a display, the display configured to present images to a user.

A step 904 may include generating and updating, by the at least one processor, a linear map based at least on the aircraft traffic data and the ownship data, wherein the linear map depicts a one-dimensional relationship between an ownship and designated traffic, wherein the linear map conveys a range between the ownship and the designated traffic and conveys a closure rate between the ownship and the designated traffic, wherein the linear map comprises: a graphical threshold indicator, the threshold indicator representing a time or distance from a threshold to the designated traffic; a graphical ownship indicator depicting a position of the ownship; a graphical scale representing a time or distance displayed by the linear map; and a graphical designated traffic indicator depicting a position of the designated traffic.

A step 906 may include outputting, by the at least one processor, the linear map as graphical data to the display.

A step 908 may include displaying, by the display, the linear map to the user.

Further, the method 900 may include any of the operations disclosed throughout.

As will be appreciated from the above, embodiments of the inventive concepts disclosed herein may be directed to a system and a method configured to provide a linear map of aircraft traffic.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a display configured to present images to a user; and
at least one processor communicatively coupled to the display, the at least one processor configured to:
receive aircraft traffic data and ownship data, the ownship data associated with an ownship and from the ownship, the ownship data including at least one of position information, speed information, trajectory information, or heading information associated with the ownship, the aircraft traffic data associated with aircraft traffic other than the ownship, the aircraft traffic data from the aircraft traffic, the aircraft traffic data including at least one of position information, speed information, trajectory information, or heading information associated with the aircraft traffic;
generate and update a linear map based at least on the aircraft traffic data and the ownship data; and
output the linear map as graphical data to the display;
wherein the display is configured to display the linear map to the user;
wherein the linear map depicts a one-dimensional relationship between the ownship and designated traffic of the aircraft traffic, wherein the linear map conveys a range between the ownship and the designated traffic and conveys a closure rate between the ownship and the designated traffic, wherein the linear map comprises:
a graphical threshold indicator, the threshold indicator representing a time or distance from a threshold to the designated traffic;
a graphical ownship indicator depicting a position of the ownship;
a graphical scale representing a time or distance displayed by the linear map; and a graphical designated traffic indicator depicting a position of the designated traffic.

2. The system of claim 1, wherein the ownship indicator is fixed near a first side of the linear map, wherein the scale has a fixed reference span, wherein the scale is allowed to slide horizontally along the display, wherein the designated traffic indicator is located at a) a zero point of the scale or b) parked at second side of the linear map if a time or distance between the ownship and the designated traffic exceeds the fixed reference span, wherein the threshold indicator slides as the scale slides.

3. The system of claim 2, wherein the linear map conveys the closure rate between the ownship and the designated traffic to the user by a motion of the scale relative to the ownship indicator.

4. The system of claim 3, wherein the scale includes tick marks and scale labels.

5. The system of claim 4, wherein the ownship indicator has an effectively transparent portion allowing scale labels to be visible through the ownship indicator or has a numerical readout of a current range to the designated traffic.

6. The system of claim 5, wherein the designated traffic indicator is depicted differently when the designated traffic indicator is parked as compared to when the designated traffic indicator is unparked.

7. The system of claim 6, wherein the threshold indicator is depicted as a line.

8. The system of claim 7, wherein the linear map further comprises a second threshold indicator representing a time or distance from a second threshold to the designated traffic.

9. The system of claim 1, wherein the scale is dynamically adjustable so that the scale represents a range that is at least as large as a current range between the ownship and the designated traffic.

10. The system of claim 9, wherein the linear map further comprises a transition indicator positioned on the linear map at a boundary of a transition zone, the transition zone representing a predetermined percentage of a width of a display area of the linear map.

11. The system of claim 10, wherein, when the threshold indicator is inside of the transition zone, the ownship indicator is fixed near a first side of the linear map, the designated traffic indicator is fixed at a zero point of the scale, and a closure rate is conveyed to the user by motion of tick marks on the scale relative to the ownship indicator.

12. The system of claim 11, wherein, when the threshold indicator reaches the transition indicator, a spacing of the tick marks on the scale becomes fixed, the ownship indicator is unfixed from near the first side and allowed to slide away from the first side, and the closure rate is conveyed to the user by motion of the ownship indicator relative to the designated traffic indicator.

13. The system of claim 12, wherein, when the ownship indicator reaches the transition indicator and is within the transition zone, the scale moves from one of the top or bottom of the linear map to another of the top or the bottom of the linear map and the closure rate is conveyed to the user by motion of the ownship indicator relative to the designated traffic indicator.

14. The system of claim 1, wherein the display is one of a primary flight display (PFD), a multi-function window (MFW) display, a head-up display (HUD), or a head-down display (HDD).

15. A method, comprising:
receiving, by at least one processor, aircraft traffic data and ownship data, the at least one processor communicatively coupled to a display, the display configured to present images to a user, the ownship data associated with an ownship and from the ownship, the ownship data including at least one of position information, speed information, trajectory information, or heading information associated with the ownship, the aircraft traffic data associated with aircraft traffic other than the ownship, the aircraft traffic data from the aircraft traffic, the aircraft traffic data including at least one of position information, speed information, trajectory information, or heading information associated with the aircraft traffic;
generating and updating, by the at least one processor, a linear map based at least on the aircraft traffic data and the ownship data, wherein the linear map depicts a one-dimensional relationship between the ownship and designated traffic of the aircraft traffic, wherein the linear map conveys a range between the ownship and the designated traffic and conveys a closure rate between the ownship and the designated traffic, wherein the linear map comprises: a graphical threshold indicator, the threshold indicator representing a time or distance from a threshold to the designated traffic; a graphical ownship indicator depicting a position of the ownship; a graphical scale representing a time or distance displayed by the linear map; and a graphical designated traffic indicator depicting a position of the designated traffic;
outputting, by the at least one processor, the linear map as graphical data to the display; and
displaying, by the display, the linear map to the user.

* * * * *